United States Patent
Kim

(10) Patent No.: US 8,545,144 B2
(45) Date of Patent: Oct. 1, 2013

(54) APPARATUS FOR PROCESSING EYEGLASS LENS

(75) Inventor: Young-Hun Kim, Gyeonggi-do (KR)

(73) Assignee: Huvitz Co., Ltd. (KR)

( * ) Notice: Subject to any disclaimer, the term of this patent is extended or adjusted under 35 U.S.C. 154(b) by 1128 days.

(21) Appl. No.: 12/495,692

(22) Filed: Jun. 30, 2009

(65) Prior Publication Data

US 2010/0080663 A1   Apr. 1, 2010

(30) Foreign Application Priority Data

Sep. 30, 2008  (KR) .......................... 10-2008-0095959

(51) Int. Cl.
*B23B 41/00*  (2006.01)

(52) U.S. Cl.
USPC ................. 409/201; 408/13; 408/16; 408/62; 408/108; 408/237

(58) Field of Classification Search
USPC ............... 408/5, 13–16, 62, 66, 89, 103, 108, 408/110–111, 116, 124, 128, 236–237; 409/201, 211
See application file for complete search history.

(56) References Cited

U.S. PATENT DOCUMENTS

| | | | | |
|---|---|---|---|---|
| 3,020,460 A | * | 2/1962 | Morin et al. | 318/594 |
| 3,323,030 A | * | 5/1967 | Inaba et al. | 318/593 |
| 3,372,321 A | * | 3/1968 | Inaba et al. | 318/594 |
| 3,566,239 A | * | 2/1971 | Taniguchi | 318/593 |
| 4,163,622 A | * | 8/1979 | Akaba et al. | 408/27 |
| 4,358,228 A | * | 11/1982 | Stark | 408/35 |
| 5,052,496 A | * | 10/1991 | Albert et al. | 173/29 |
| 6,790,124 B2 | * | 9/2004 | Shibata | 451/5 |
| 7,198,547 B2 | | 4/2007 | Kim et al. | |
| 7,374,373 B1 | * | 5/2008 | Park | 408/12 |
| 7,975,355 B2 | * | 7/2011 | Nauche et al. | 29/26 A |
| 8,342,909 B2 | * | 1/2013 | Lemaire et al. | 451/11 |
| 2006/0217036 A1 | * | 9/2006 | Meunier et al. | 451/5 |

FOREIGN PATENT DOCUMENTS

JP   2003-145328   5/2003
KR   10-0645779   11/2006

* cited by examiner

*Primary Examiner* — Daniel Howell
(74) *Attorney, Agent, or Firm* — Blakely Sokoloff Taylor & Zafman

(57) ABSTRACT

An apparatus for processing an eyeglass lens which is capable of forming a hole or various shapes on an eyeglass lens is disclosed. The apparatus includes a pair of lens fixing shafts for clamping a lens; a carriage which supports and moves the lens fixing shafts; a lens rotation motor for rotating the lens fixing shafts; and a drilling part for forming a hole on the lens, wherein the drilling part includes: a drill head having a drill to which a drill bit is fixed; a drill head mover which is connected with the drill head and moves the drill head straightly; and a fixing block which supports and fixes the drill head mover on the apparatus for processing an eyeglass lens.

7 Claims, 4 Drawing Sheets

APPARATUS FOR PROCESSING EYEGLASS LENS

This application claims the priority benefit of Korean Patent Application No. 10-2008-0095959 filed on Sep. 30, 2008, the entire contents of which are incorporated herein by reference.

FIELD OF THE INVENTION

This invention relates to an apparatus for processing an eyeglass lens, and more particularly to an apparatus for processing an eyeglass lens having a drilling part which is capable of forming a hole or various shapes on an eyeglass lens.

BACKGROUNDS OF THE INVENTION

A lens for improving or protecting one's eyesight is produced in a circular shape, which is commonly called a blank lens. The blank lens should be processed to fit into the frame of an eyeglass for being used. Such processing of the blank lens is carried out by a lens edger which is an apparatus for processing an eyeglass lens. In a prior lens edger, a lens model (i.e., a pattern) which fits into the frame of an eyeglass is used for the blank lens processing. However, recently, a patternless processing apparatus without using the lens model is developed and generally used. The patternless processing apparatus detects the shape of an eyeglass frame or the shape of a processed lens with a tracer, and grinds a blank lens into the detected shape while changing the position of the blank lens according to the detected shape. In the patternless processing apparatus, the blank lens is fixed between two corresponding axes, and the positions of the two axes are changed to grind the blank lens into the desired shape. The patternless processing apparatus not only process the blank lens into a desired shape, but also forms a groove at the edge of the processed lens to fix a lens fixing wire (a groove forming function), grinds the edge of the lens to form a smooth edge (a smooth edge forming function), or forms a ∧-shaped protrusion at the edge of the processed lens which fits into a groove of a eyeglass frame (a ∧-shaped protrusion forming function). FIG. 1 shows a conventional patternless apparatus for processing an eyeglass lens. As shown in FIG. 1, the conventional patternless processing apparatus comprises an opening window 2 for inserting/drawing an eyeglass lens into/from the apparatus and control-switches 3 for controlling the apparatus.

After processing the blank lens into a desired shape, forming a groove at the edge of the processed lens, and grinding the edge with the processing apparatus, if necessary, a drilling operation is carried out for forming a hole on the processed lens. For example, the hole is formed to fix a bridge or a temple on the lens of a rimless eyeglass. For forming the hole, a conventional hand drill or a conventional bench drill is generally used. The conventional hand drill is designed to fit into a human hand, and includes a motor and a chuck for mounting a drill bit. When using the hand drill, power is supplied to the motor to rotate the chuck and the drill bit. The operator holds an eyeglass lens with a hand, and moves the hand drill perpendicularly to the eyeglass lens with other hand to form a hole on the eyeglass lens. In the bench drill, a motor and a chuck for mounting a drill bit constitute a drilling body, and the drilling body is located to move vertically on a bench. The operator positions an eyeglass lens at the trajectory of the drill bit on the bench, and moves the drilling body downwardly to the eyeglass lens to form a hole on the eyeglass lens.

In case of the hand drill, it is dangerous for a non skilled operator to control the hand drill, and it is not easy to form a hole at an exact position. When the hole is formed at a wrong position, the expensive processed lens should be discarded. The bench drill is easy to handle and safer with compared to the hand drill, and more accurate hole formation is possible with the bench drill. However, there is a need for more accurate and safer apparatus for forming the hole on an eyeglass lens.

SUMMARY OF THE INVENTION

Therefore, it is an object of the present invention to provide an apparatus for processing an eyeglass lens which is capable of forming a hole or various shapes accurately and precisely on an eyeglass lens.

It is other object of the present invention to provide an apparatus for processing an eyeglass lens which can be safely operated.

It is another object of the present invention to provide an apparatus for processing an eyeglass lens which decreases the processing costs and time.

To accomplish these and other objects, the present invention provides an apparatus for processing an eyeglass lens, comprising: a pair of lens fixing shafts for clamping a lens; a carriage which supports and moves the lens fixing shafts; a lens rotation motor for rotating the lens fixing shafts; and a drilling part for forming a hole on the lens, wherein the drilling part includes: a drill head having a drill to which a drill bit is fixed; a drill head mover which is connected with the drill head and moves the drill head straightly; and a fixing block which supports and fixes the drill head mover on the apparatus for processing an eyeglass lens. Preferably, the drill head mover includes: a fixed nut which is fixed on the fixing block, and does not move or rotate; a rotation screw, one end of which is rotatably connected to the drill head, and which is also rotatably fitted into the fixed nut; a motor which is connected to the other end of the a rotation screw, and rotates the rotation screw, and wherein the drill head, the rotation screw, and the motor move straightly with respect to the fixed nut when the rotation screw rotates.

DETAILED DESCRIPTION OF THE INVENTION

A more complete appreciation of the invention, and many of the attendant advantages thereof, will be better appreciated by reference to the following detailed description.

Figure 1:
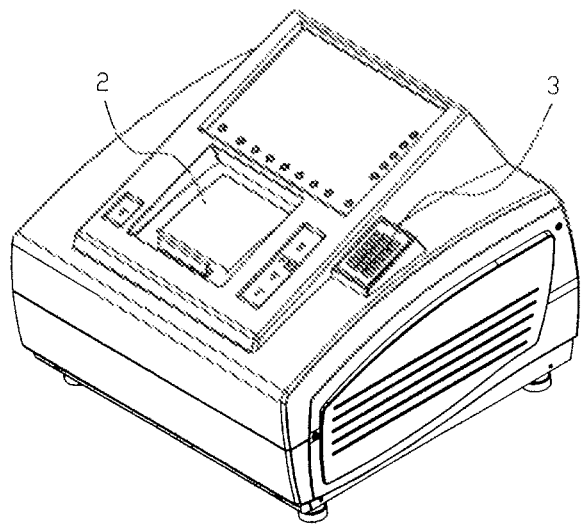
FIG. 1 is a perspective view of a conventional apparatus for processing an eyeglass lens.
Figure 2:
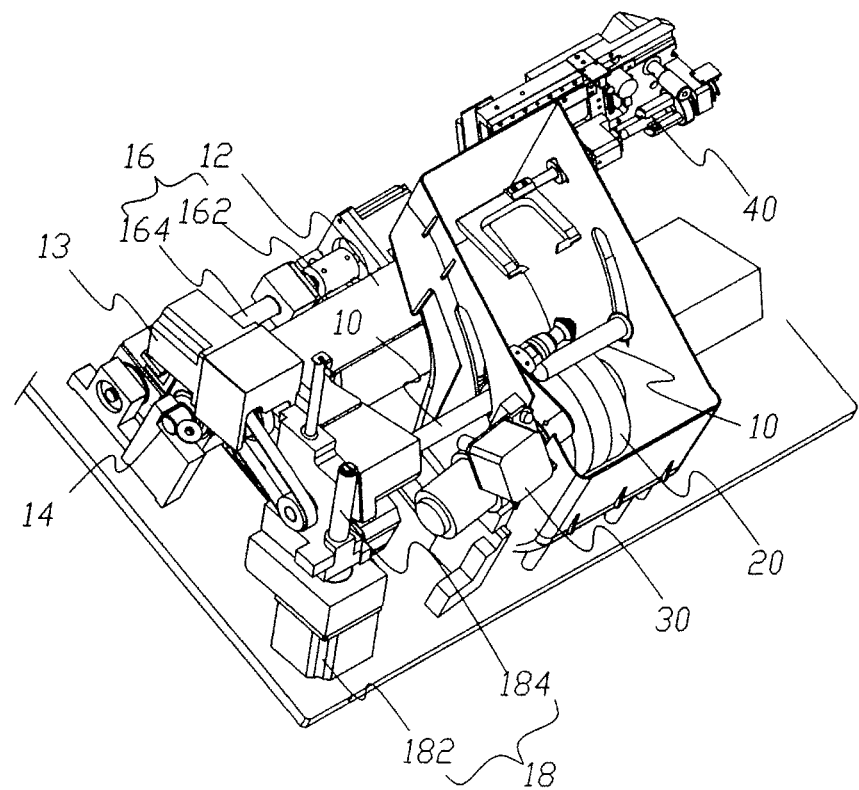
FIG. 2 is a perspective view showing an internal structure of an apparatus for processing an eyeglass lens according to an embodiment of the present invention.

FIG. 2 is a perspective view showing an internal structure of an apparatus for processing an eyeglass lens according to an embodiment of the present invention. As shown in FIG. 2, the apparatus for processing an eyeglass lens comprises a pair of lens fixing shafts 10 for clamping a lens (not shown); a carriage 12 which supports and moves the lens fixing shafts 10; a lens rotation motor 13 for rotating the lens fixing shafts 10; a carriage movement axis 14 which is mounted at one end of the carriage 12 for allowing a rotation of the carriage 12 and a straight sliding movement of the carriage 12 along the carriage movement axis 14; a horizontal driving means 16 which moves the carriage 12 horizontally along the carriage movement axis 14; a vertical driving means 18 which rotates (i.e., vertically moves) the carriage 12 along the rotational direction of the carriage movement axis 14; and a grinding wheel 20 for grinding the lens clamped between the lens fixing shafts 10 into a predetermined shape. The apparatus may further include a groove forming part 30 for forming a groove at the edge of the lens; and a measuring part 40 for measuring curvatures of the lens. The aforementioned lens fixing shafts 10, the carriage 12, the lens rotation motor 13, the horizontal driving means 16, the vertical driving means 18, the groove forming part 30, and measuring part 40 are conventional parts in the field of the apparatus for processing an eyeglass lens, and are disclosed in Korean Patent No. 10-645779 and U.S. Pat. No. 7,198,547, the entire contents of which are incorporated herein by reference.

Referring to FIG. 2, a lens processing operation with the apparatus will be explained briefly. Firstly, a lens is clamped between the pair of lens fixing shafts 10. Then the lens rotation motor 13 operates to rotate the lens fixing shafts 10 and the lens so that the part of the lens to be grinded is directed to the grinding wheel 20. The horizontal driving means 16 and the vertical driving means 18 operate to move the carriage 12 horizontally and vertically so that the lens is contacted with the grinding wheel 20. Then the lens is grinded by rotating the grinding wheel 20 with a high-speed. The horizontal driving means 16 may consist of a driving motor 162 and a screw 164. The screw 164 rotates by the driving force of the motor 162, and one end of the screw 164 is mounted in the carriage 12 to change the rotational movement of the motor 162 to the straight movement of the carriage 12. The vertical driving means 18 may also consist of a driving motor 182 and a screw 184. The screw 184 rotates by the driving force of the motor 182, and one end of the screw 184 is mounted in the carriage 12 to change the rotational movement of the motor 182 to the vertical movement of the carriage 12.

Figure 3:
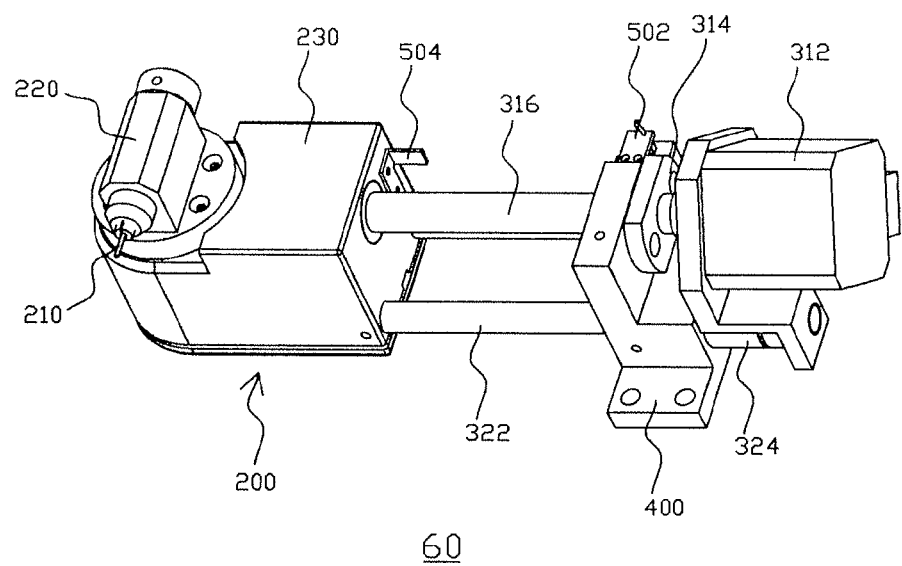
FIG. 3 is a perspective view of a drilling part of an apparatus according to an embodiment of the present invention.

The apparatus for processing an eyeglass lens according to an embodiment of the present invention further includes a drilling part for forming a hole on the lens. FIG. 3 is a perspective view of the drilling part. The drilling part 60 shown in FIG. 3 includes a fixing block 400, a drill head mover, and a drill head 200. Preferably, the fixing block 400 can be located outside of a grinding room where the lens is grinded, the drill head 200 can be located inside of the grinding room, and the drill head mover may penetrate the wall forming the grinding room. However, it is possible for the drilling part to be installed in the grinding room. As shown in FIG. 3, the drill head 200 includes a drill 220 to which a drill bit 210 is fixed. The drill head mover is connected with the drill head 200 and moves the drill head 200 straightly, for example, horizontally. The fixing block 400 supports and fixes the drill head mover on the apparatus for processing an eyeglass lens. The drilling part 60 may further include a sensor 502 for recording the initial position of the drill head 200 by detecting a sensor dog 504 formed on the drill head 200.

The drill head mover may includes a rotation screw 316, a motor 312 and a fixed nut 314. One end of the rotation screw 316 is rotatably connected to the drill head 200, the other end of the rotation screw 316 is connected to the motor 312, and the rotation screw 316 is also rotatably fitted into the fixed nut 314. The fixed nut 314 is fixed on the fixing block 400, and does not move or rotate. The fixed nut 314 has an inner hole on which screw threads are formed and through which the rotation screw 316 passes, and the screw threads of the fixed nut 314 are engaged with the screw threads of the rotation screw 316. The rotation screw 316 is rotated by the driving force of the motor 312. However, the fixed nut 314, the drill head 200, and the body of the motor 312 do not rotate even when the rotation screw 316 rotates, but are allowed to move straightly. Since the rotation screw 316 is rotatably fitted into the fixed nut 314 in such way, the drill head 200, the rotation screw 316, and the motor 312 move straightly with respect to the fixed nut 314 when the rotation screw 316 rotates. In other words, because the rotation screw 316 is screw-connected with the fixed nut 314, when the rotation screw 316 rotates while engaging with the fixed nut 314, the rotation screw 316 moves to a left direction or a right direction along the axis of the rotation screw 316. That is, when the rotation screw 316 rotates, the rotation screw 316 and the drill head 200 also moves straightly. According to such operation mechanism, the drill head 200 moves to the position for a drilling operation, and then the drilling operation is carried out. The straight movement of the drill head 200 and/or the motor 312 while preventing the rotations of the drill head 200 and/or the motor 312 can be guided by a guider. One examples of the guide is shown in FIG. 3. By controlling the amounts of rotation of the motor 312 and the rotation screw 316, the moving distance of the drill head 200 can be controlled. The moving distance of the drill head 200 may change according to the position of a lens on which a hole is formed, and the initial position of the drill head 200. The rotations of the motor 312 can be controlled by a controller in the apparatus for processing an eyeglass lens. A conventional stepping motor, which is generally used in a NC(Numerical control) machine, an industrial robot, a printer, a copier, etc., can be used as the motor 312.

As shown in FIG. 3, preferably, the drilling part 60 may further include a guide 322 and a linear bush 324. The guide 322 is provided for a straight movement of the drill head 200 and to prevent the undesirable rotation of the drill head 200. One end of the guide 322 is connected to the drill head 200 and the guide 322 passes a hole formed on the fixing block 400 so that the guide 322 moves straightly along the axis thereof and passes through the fixing block 400. Due to the guide 322, the drill head 322 may move straightly with respect to the fixing block 400, but does not rotate with respect to the fixing block 400. More preferably, the other end of the guide 322 is connected to the motor 312 to prevent the undesirable rotation of the body of the motor 312. The guide 322 may have a circular cross section, and one or more guide 322 can be mounted on the fixing block 400. If necessary, the linear bush 324 can be mounted on the hole formed on the fixing block 400 to accommodate the guide 322 and to smoothly pass the guide 322. More preferably, a plurality of metal balls is provided in the linear bush 324 to reduce the frictions between the guide 322 and the linear bush 324. That is, the guide 322 passes the linear bush 324 while contacting the plurality of metal balls with a reduced friction.

Figure 4:
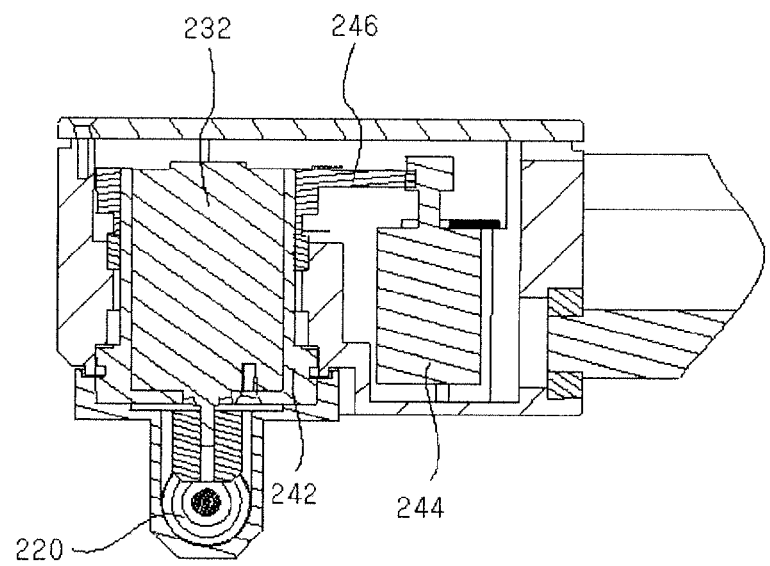
FIG. 4 is a sectional view of a drill head of an apparatus according to an embodiment of the present invention.

As shown in FIG. 3, the drill head 200 includes a drill 220 and a drill bit 210, and preferably a drill rotator 230. The drill 220 and the drill bit 210 are conventional in the art, and the drill bit 210 is fixed on the end of the drill 220. The drill rotator 230 is provided for rotating the direction of the drill 220. The rotation of the direction of the drill 220 is necessary for forming a hole having a desirable direction and/or a desirable location on a lens or for forming a hole on a lens perpendicularly to the surface of the lens. FIG. 4 is a sectional view of the drill head 200 according to an embodiment of the present invention. As shown in FIG. 4, in one embodiment, the drill rotator 230 includes a rotation frame 242 and a rotation motor 244. The rotation frame 242 rotatably supports the drill 220. Namely, the rotation frame 242 fixes the drill 200 on the drill rotator 230 but allows the rotation of the direction of the drill 220. The rotation motor 244 is provided to rotate the rotation frame 242 and therefore the direction of the drill 220. The rotational force of the rotation motor 244 can be transferred to the rotation frame 242 by a conventional power transfer means such as a rotation gear 246, a belt and so on. As the rotation motor 244 rotates, the rotation frame 242 and the drill 220 rotate.

Figure 5:
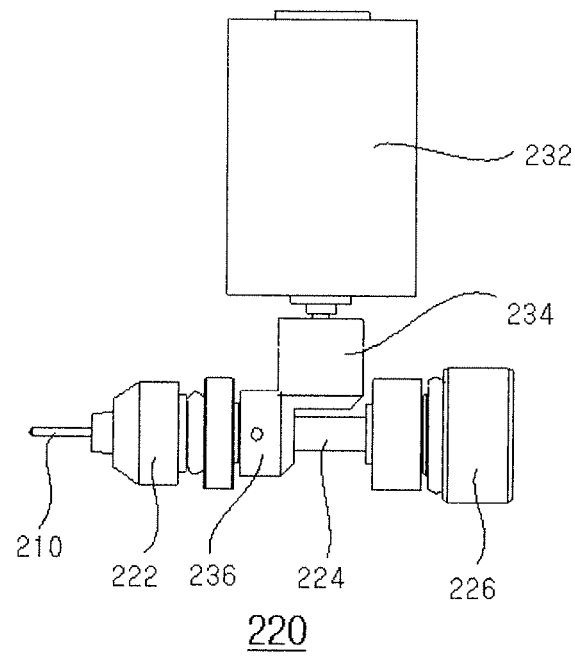
FIG. 5 is a drawing for illustrating a drill of an apparatus according to an embodiment of the present invention.

FIG. 5 is a drawing for illustrating a drill of an apparatus according to an embodiment of the present invention. As shown in FIG. 5, the drill 220 includes a drill body 224, a drill chuck 222, a knob 226 and a drill motor 232. The drill chuck 222 is mounted on one end of the drill body 224 and into which the drill bit 210 is inserted. The knob 226 is mounted on the other end of the drill body 224 and controls the drill chuck 222 to insert and release the drill bit 210. By turning the knob 226, the space in the drill chuck 222 for accommodating the drill bit 210 becomes narrower or wider. Thus, by controlling the knob 226, the drill bit 210 can be inserted into the drill chuck 222 or can be released from the drill chuck 222. The drill motor 232 is provided for rotating the drill chuck 222, and the drill bit 210 fixed on the drill chuck 222. The driving force of the drill motor 232 rotates the drill bit 210 with a high speed and a hole can be formed on a lens by the rotation of the drill bit 210. The rotational force of the drill motor 232 can be transferred to drill chuck 222 and the drill bit 210 by a conventional power transfer means such as bevel gears 234, 236.

Figure 6:
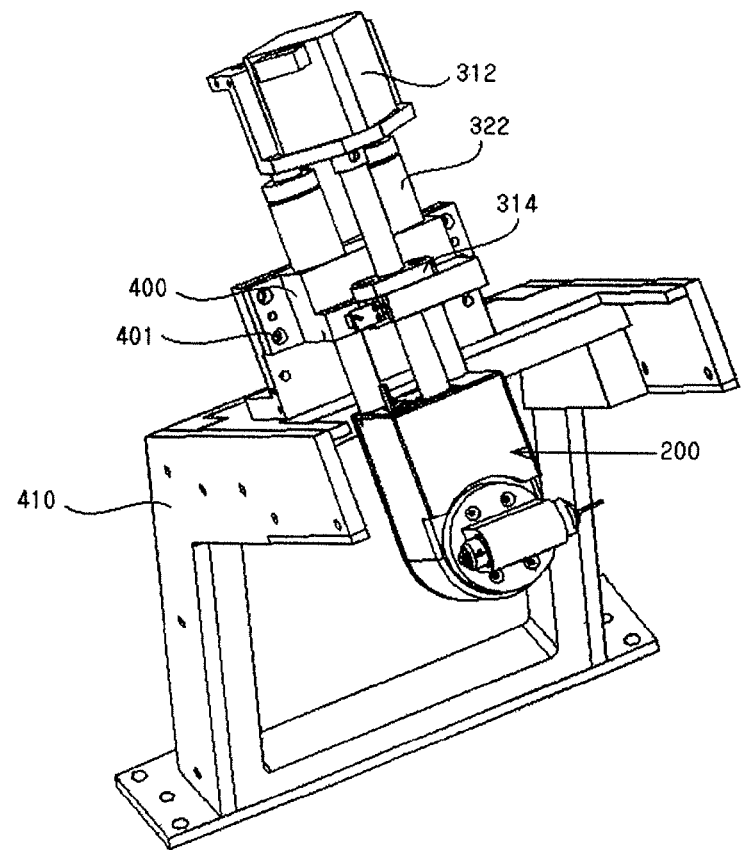
FIG. 6 is a drawing for illustrating a fixing block of an apparatus according to an embodiment of the present invention.

The fixing block 400 which supports the drill head 200 and the drill head mover can be fixed on the apparatus of the present invention with a conventional connection means, such as a bolt and a nut. FIG. 6 is a drawing for illustrating the fixing block of the apparatus according to an embodiment of the present invention. As shown in FIG. 6, the fixing block 400 can be connected to a fixing stand 410 which is formed inside of the apparatus of the present invention. The fixing block 400 and the fixing stand 410 can be connected by a conventional connection means, such as a bolt and a nut 401.

The position of the drill head 200 should be precisely controlled to form a hole at the exact position of a lens. Thus, the initial position of the drill head 200 should be detected and precisely recorded. As shown in FIG. 3, to detect the initial position of the drill head 200, the drilling part 60 may further include the sensor 502 and the sensor dog 504. The sensor 502 is fixed on a predetermined position of the apparatus of the present invention, for example, is fixed on the fixing block 400. The sensor dog 504 is mounted on the drill head 200 so that the sensor 502 detects the sensor dog 504 when the drill head 200 is in its initial position. Thus, when the sensor 502 detects the sensor dog 504, it means that the drill head 200 is in its initial position. As the sensor 502, a light sensor can be used. The light sensor may include a part for radiating a measurement light and a part for receiving and detecting the measurement light. The sensor dog 504 may have a structure of being located between the part for radiating the measurement light and the part for receiving the measurement light. In initial state, the sensor dog 504 is located between the part for radiating the measurement light and the part for receiving the measurement light of the light sensor 502. When the drill head 200 moves away from the fixing block 400, the sensor dog 504 deviates form the light sensor 502, and accordingly the moving distance of the drill head 200 from its initial position can be controlled.

Figure 7:
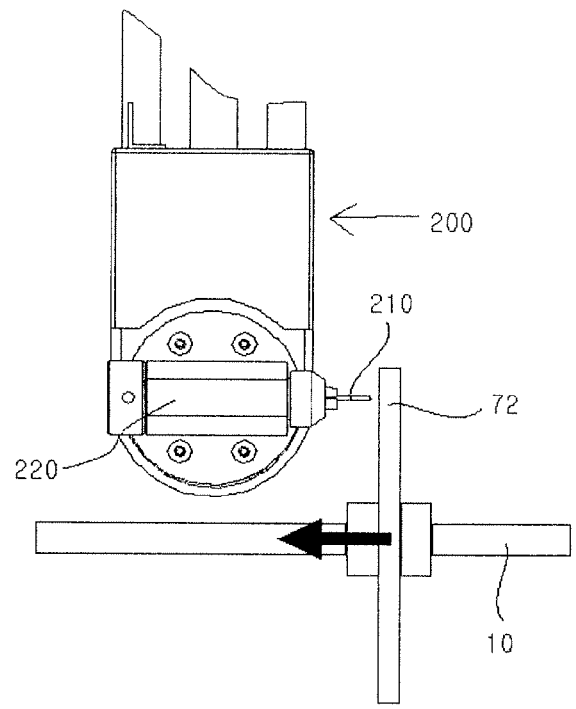
FIG. 7 is a drawing for showing a drilling process with an apparatus according to an embodiment of the present invention.
Figure 8:
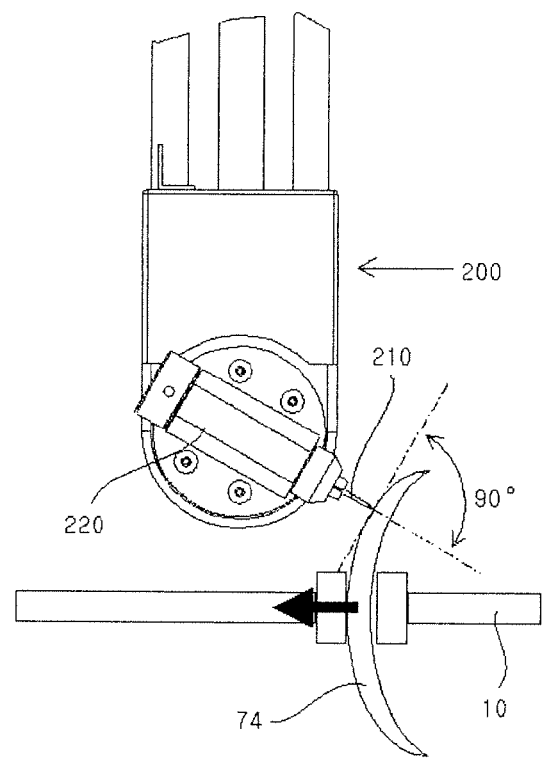
FIG. 8 is a drawing for showing other drilling process with an apparatus according to an embodiment of the present invention.

The drilling operation of the apparatus according to an embodiment of the present invention will be described. FIGS. 7 and 8 are drawings for showing the drilling process for an aspherical lens and a spherical lens, respectively. As shown in FIG. 7, the drill head 200 moves straightly toward a lens 72 to form a hole on the lens 72. The drill head 200 moves downwardly in the configuration of FIG. 7. The moving distance of the drill head 200 is proportional to the rotation degree of the motor 312 (FIG. 3), and can be controlled by the motor 312. Then, the lens 72 moves toward the drill bit 210 by moving the lens fixing shafts 10 clamping the lens 72. For the aspherical lens 72, the drill bit 210 is positioned to be perpendicular to the surface of the lens 72, and the rotation of the direction of the drill 220 is not necessary. When the drill bit 210 contacts the lens 72, the drill 220 rotates the drill bit 210 to form a hole on the lens 72. For forming the hole on the lens 72, the lens 72 keeps moving towards the drill bit 210. As shown in FIG. 8, when a spherical lens 74 is used, the direction of the drill 220 rotates so that the drill bit 210 is positioned to be perpendicular to the surface of the lens 74. The rotation degree of the direction of the drill 220 depends on the curvature of the lens 74. When the drill bit 210 contacts the lens 74, the drill 220 rotates the drill bit 210 to form a hole on the lens 74. While forming the hole on the lens 74, the positions of the drill head 200, the drill 220 and lens 74 can be controlled to form the hole straightly and neatly on the lens 74 with reduced friction.

By using the apparatus for processing an eyeglass lens of the present invention, a hole can be formed on an eyeglass lens accurately, precisely, safety, automatically and economically. In the present invention, the hole can be formed on a lens with considering the curvature of the lens, and thus the hole can be formed at the position which is very close to the edge of the lens. In this disclosure, there is shown and described only the preferred embodiments of the present invention, but, as aforementioned, it is to be understood that the present invention is capable of use in various other combinations and environments and is capable of change or modifications within the scope of the inventive concepts as expressed herein.

The invention claimed is:

1. An apparatus for processing an eyeglass lens, comprising:
    a pair of lens fixing shafts for clamping a lens;
    a carriage which supports and moves the lens fixing shafts;
    a lens rotation motor for rotating the lens fixing shafts; and
    a drilling part for forming a hole on the lens, wherein the drilling part includes:
        a drill head having a drill to which a drill bit is fixed;
        a drill head mover which is connected with the drill head and moves the drill head straightly; and
    a fixing block which supports and fixes the drill head mover on the apparatus for processing an eyeglass lens, wherein the drilling part further include a sensor which is fixed on a predetermined position of the apparatus; and
    a sensor dog which is mounted on the drill head, and the sensor detects the sensor dog when the drill head is in its initial position, wherein the sensor is a light sensor having a part for radiating a measurement light and a part for receiving and detecting the measurement light, and the sensor dog have a structure of being located between the part for radiating the measurement light and the part for receiving the measurement light.

2. The apparatus according to claim 1, wherein the drill head mover includes:
- a fixed nut which is fixed on the fixing block, and does not move or rotate;
- a rotation screw, one end of which is rotatably connected to the drill head, and which is also rotatably fitted into the fixed nut;
- a motor which is connected to the other end of the a rotation screw, and rotates the rotation screw, and
- wherein the drill head, the rotation screw, and the motor move straightly with respect to the fixed nut when the rotation screw rotates.

3. The apparatus according to claim 1, further comprising a guide, one end of which is connected to the drill head and which passes a hole formed on the fixing block so that the guide moves straightly along the axis thereof and passes through the fixing block.

4. The apparatus according to claim 1, wherein the drill head includes a drill rotator for rotating the direction of the drill.

5. The apparatus according to claim 4, wherein the drill rotator includes
- a rotation frame which fixes the drill on the drill rotator but allows a rotation of a direction of the drill; and
- a rotation motor which rotates the rotation frame.

6. The apparatus according to claim 5, wherein a rotational force of the rotation motor is transferred to the rotation frame by a rotation gear.

7. The apparatus according to claim 5, wherein a rotational force of the rotation motor is transferred to the rotation frame by a belt.

* * * * *